E United States Patent [19]

Monford, Jr.

[11] Patent Number: 5,125,601
[45] Date of Patent: Jun. 30, 1992

[54] PAYLOAD RETENTION DEVICE

[75] Inventor: Leo G. Monford, Jr., Dickinson, Tex.

[73] Assignee: The United States of America as represented by the Administrator, National Aeronautics and Space Administration, Washington, D.C.

[21] Appl. No.: 813,558

[22] Filed: Dec. 26, 1991

[51] Int. Cl.$^5$ .............................................. B64G 1/62
[52] U.S. Cl. ................................ 244/161; 294/65.5; 294/86.4; 901/30; 901/46
[58] Field of Search ............... 244/161, 158 R, 157.1, 244/159, 118.1; 294/86.4, 65.5, 66.2; 414/29, 45; 901/30, 40, 46; 335/285-291

[56] References Cited

U.S. PATENT DOCUMENTS

| | | | |
|---|---|---|---|
| 4,350,379 | 9/1982 | Peroutry | 294/65.5 |
| 4,508,296 | 4/1985 | Clark | 244/158 R |
| 4,631,815 | 12/1986 | Bocchicchio et al. | 294/64.1 X |
| 4,921,292 | 5/1990 | Harwell et al. | 294/65.5 |
| 4,929,009 | 5/1990 | Vandersluis et al. | 294/2 |
| 4,929,011 | 5/1990 | Vandersluis et al. | 294/86.4 |
| 4,955,654 | 9/1990 | Tsuchihashi | 244/161 X |
| 4,965,645 | 10/1990 | Baumann | 294/65.5 |

Primary Examiner—Joseph F. Peters, Jr.
Assistant Examiner—Christopher P. Ellis
Attorney, Agent, or Firm—Hardie R. Barr; Guy M. Miller; Edward K. Fein

[57] ABSTRACT

A payload retention device (10) for grappling and retaining a payload (14) in docked position on a supporting structure (18) in the cargo bay of a space vehicle. The device comprises a two-fault tolerant electromagnetic grappling system comprising electromagnets (30A,30B) for attracting and grappling a grapple strike plate (20) affixed to the payload when in proximity thereto and an electromechanical latching assembly comprising a pair of independent latching subassemblies. Each subassembly comprises a set of latching pawls (29) which are driven into latching and unlatching positions relative to a grappled payload by a pair of gearmotors (40), each equipped with a ratchet clutch drive mechanism (75, 76) which is two-fault tolerant with respect to latching such that only one gearmotor of the four needs to be operational to effect a latch of the payload but is single fault tolerant with respect to release of a latched payload. Sensors (72,92,96) are included for automatically sensing the magnetic grappling of a payload and for automatically de-energizing the gearmotors (40) of the latching subassemblies when a latch condition is achieved.

6 Claims, 10 Drawing Sheets

PAYLOAD RETENTION DEVICE

ORIGINAL OF THE INVENTION

The invention described herein was made by an employee of the United States Government and may be manufactured and used by or for the Government of the United States of America for governmental purposes without the payment of any royalties thereon or therefor.

FIELD OF THE INVENTION

This invention relates to a payload retention device for the temporary storage of payloads, and more particularly to a combined electromagnetic grappling apparatus and electromechanical latching assembly for the temporary stowage and retention of a payload on a carrier platform in the cargo bay of a space vehicle.

BACKGROUND OF THE INVENTION

The storage of payloads in the cargo bay of a space vehicle imposes many design requirements for the storage apparatus to accommodate the problems which are uniquely associated with the launch of the vehicle, the deployment and retrieval of a payload during space flight operations, and with the landing of the space vehicle. Redundancies of many components are necessary to assure that safety is not compromised in the event of system or component failures and to help insure mission success. Payload handling in the deployment and retrieval of a payload during an on-orbit operation is usually accomplished by means of an end effector affixed to the manipulator arm of a remote manipulator system typically mounted in the cargo bay of the vehicle. A potentially unsafe situation occurs when the remote manipulator arm grapples a payload which is attached to the orbiter vehicle. Any failure in the grappling mechanisms of the remote manipulator system or the payload docking fixture which prevents a release of the payload would keep the manipulator arm protruding outside the cargo bay envelope and prevent the closing of the cargo bay doors. The extra-vehicular activity of an astronaut to attempt the manual release of a stuck and effector or payload is generally undesirable because of the many associated perils and the costs involved.

Heretofore, the various latching apparatuses and systems for the retention of a payload in the cargo bay of a space vehicle have been complex mechanical systems which are not fault-tolerant in operation, such as a latching apparatus as disclosed in U.S. Pat. No. 4,508,296. Similar complex mechanical apparatuses with grappling and latching capabilities are shown in U.S. Pat. Nos. 4,929,009 and 4,929,011.

SUMMARY OF THE INVENTION

The present invention is a payload retention device for the carrying and temporary storage of a payload in a space vehicle. The device includes an assembly of latches in an electromechanical latching assembly for carrying launch and landing loads associated with a docked payload and a two-fault tolerant electromagnetic grappling system for use when deploying the payload to a remote manipulator system or berthing therefrom and also for stowage of a payload during space flights. The electromagnetic grappling system includes two electromagnet assemblies for redundancy, each of which comprises a pull-in coil and a pair of holding coils. The electromagnets are tolerant of two power failures without releasing the magnetically grappled payload.

When powered on by a single panel switch, the electromagnets attract the payload against the force of a spring washer mounted about the periphery of the base plate of the payload retention device and adapted to support the payload thereon. The movement of the payload towards the electromagnets trips a contact sensor mounted on the base plate for signaling when the payload is "seated" and grappled. The contact sensor automatically switches off the energizing circuits for the pull-in coils while the holding coils remain in the "ON" condition.

With the payload "seated" and magnetically grappled, the astronaut can then operate the motor-driven mechanical latch assembly for latching the payload during non-use periods and during launch and landing operations with the electromagnets normally turned off during such periods. The electromechanical latch assembly comprises two independent latching sub-systems, each of which comprises a cam ring gear and two gear motors for driving the associated cam ring gear in rotation about its central axis. Also, in each latching subsystem, latching pawls are mounted in equiangular spacing about the periphery of its cam-ring gear in camming engagement therewith whereby camming surfaces of the cam ring gear are adapted to drive the pawls outwardly of the cam ring gear to the unlatching position and also to control movement of the pawls inwardly to the latching position wherein the pawls engage and latch the payload. The cam ring gears of the two electromechanical latching subsystems are of equal diameter and are mounted to the base plate at the top of the housing of the payload retention device in concentric relation thereon. The pawls of each latching subsystem are located intermediate the pawls of the other latching subsystem and in the latching condition, the pawls of both subsystems hold onto an annular lip provided on the payload.

The gearmotors are equipped with ratchet drives and clutch overrides to drive the cam ring gears in only one direction of rotation. By means of the override, if one gearmotor in a subsystem should fail, the other motor will drive its cam ring gear. The electromechanical latching assembly of the invention is therefore two fault tolerant on effecting a capture by latching since it is only necessary the cam ring gear of one subassembly be movable to effect a latching condition thereby requiring only that one gearmotor be operative. However, the latching assembly is single fault tolerant on release since both cam ring gears must be movable to release all latching pawls. In addition, optical sensors are provided for indicating a latched or unlatched condition of the pawls, from which indication the astronaut operator may elect to de-energize the holding coils.

DETAILED DESCRIPTION OF THE INVENTION

Figure 1:
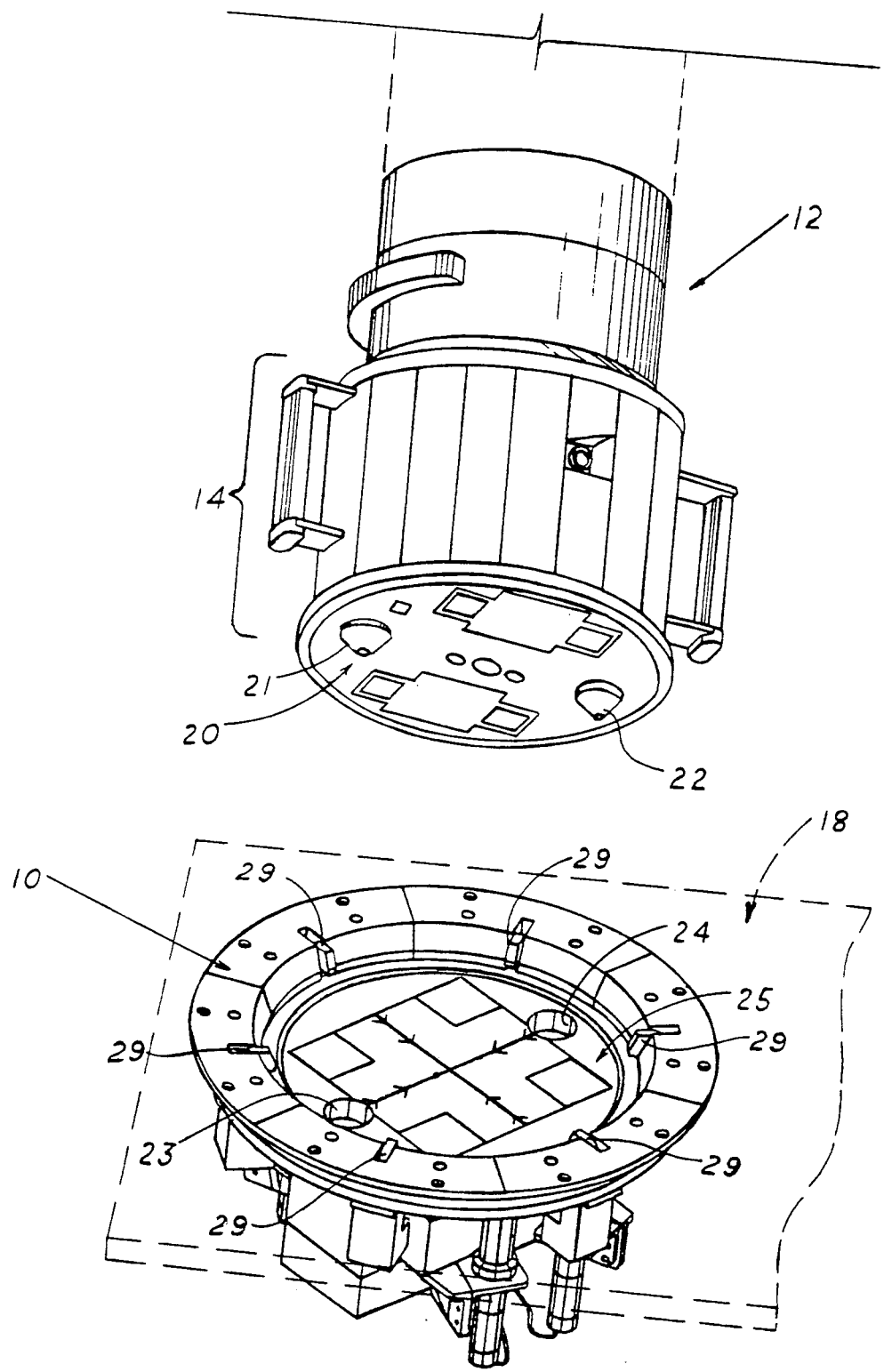
FIG. 1 is an exploded view in perspective of the manipulator arm of a remote manipulator system with an end effector payload operably connected thereto and in proximity to a payload retention device representing a preferred embodiment of the invention.
Figure 2:
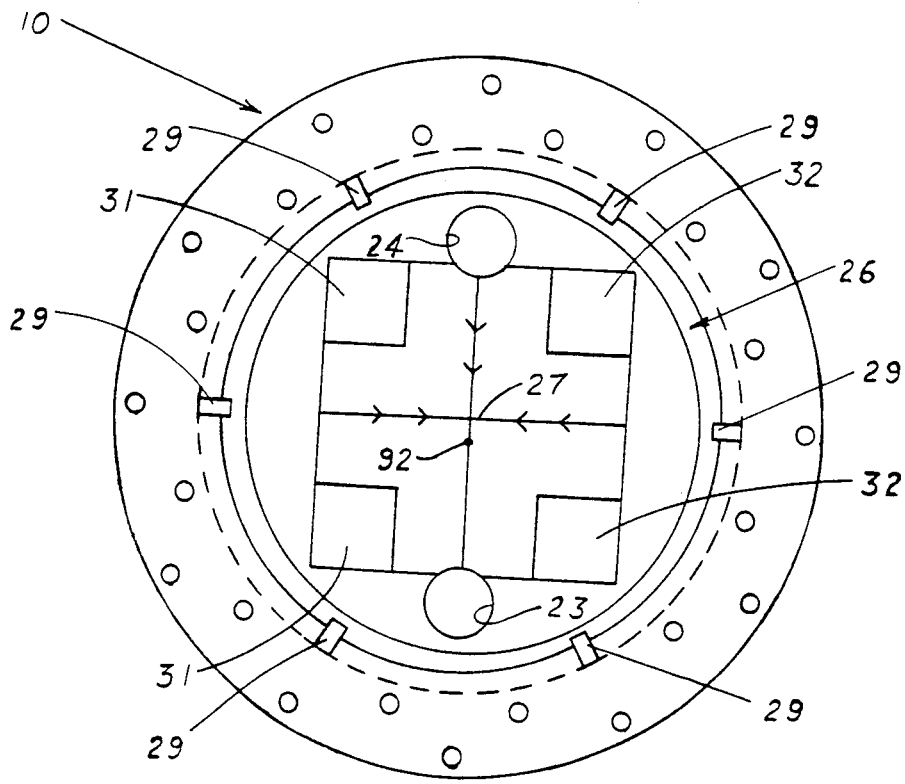
FIG. 2 is a plan view of the payload retention device shown in FIG. 1.

Referring more particularly to the drawings, there is shown in FIG. 1, a payload retention device 10 representing a preferred embodiment of the invention which is approached by the manipulator arm 12 of a remote manipulator system to which a payload 14 is attached. The payload 14 is represented by an electromagnetic attachment mechanism which, by operation of the remote manipulator system, may be guided and controlled to effect an attachment to an object to be captured but, as shown in FIG. 1, is being directed towards the payload retention device 10 for an eventual docking therewith and for its temporary retention and stowage.

The payload retention device 10 is typically mounted in the cargo bay of a space vehicle on a support 18, as shown in dashed lines, which could be fixed to the floor or a side wall of the cargo bay, in any suitable fashion. The remote manipulator system, which includes the arm 12, might also be mounted in the cargo bay of the space vehicle or could be mounted on a space station structure.

The payload 14 is equipped with a strike plate or base plate 20 and a pair of alignment pins 21,22 which project from the base 20 and are adapted to register with and seat in a pair of holes or sockets 23,24 formed in the base plate 25 of the retention device 10. The base plate 25 is preferably a light weight material such as aluminum and the sockets 23,24 are spaced and sized to snugly accommodate the alignment pins 21,22, each of which is provided with a tapered frusto-conical surface to facilitate and guide the entry of the alignment pins into the sockets 23,24.

To facilitate alignment of the manipulator arm 12 with the payload retention device 10 in effecting the docking of a payload thereto, the base plate 25 includes a visual alignment aide in the form of a mirrored surface provided with a target pattern in the form of perpendicular cross hair markings or lines 27 which intersect at the center of the base plate 25. The cross hair lines 27 are placed on the mirror surface by coating or abrading the mirror surface with one of the cross hair lines disposed in collinear relation with the centers of the pin sockets 23,24. The cross hair lines 27 are provided for viewing by a camera which may be provided on a payload, such as a centerline mounted camera on the payload 14 in FIG. 1 which is a part of a target docketing and alignment system as described in U.S. Pat. No. 4,890,918. In such an alignment system, the camera itself and an associated camera monitor are both provided with alignment marks which can be used in conjunction with the cross hair lines 27 as visual alignment aides in maneuvering the manipulator arm 12. The relative positions of the cross hair lines and the camera alignment marks are controlled by the operator of the remote manipulator system to effect the "translational" and "rolling" alignment of the payload with the base plate 25 such that the alignment pins 21,22 are aligned in registry with the sockets 23,24 and the payload retention device 10 can be approached for docking.

The payload retention device 10 is suitable for grappling and securely retaining almost any type of payload thereon. It is important, however, that the payload be equipped with a ferrous strike plate or base member such as the circular base member 20 of the payload 14 in FIG. 1 and that it be equipped with a pair of alignment pins. Accordingly, a disc-like base member of ferrous material which is equipped with alignment pins such as base 20 and pins 21,22 is required to be mounted by bolting, welding or the like as a fixture to any payload to be grappled and retained by the payload retention device 10.

Figure 12B:
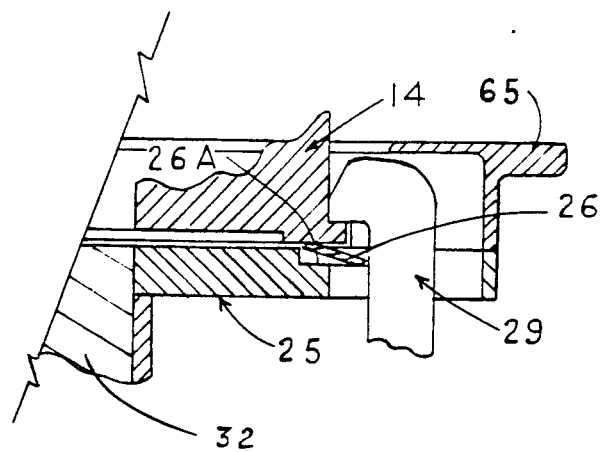
FIGS. 12A and 12B are views similar to FIG. 11 but showing the relative positions of a latching pawl and a payload as the pawl begins to unlatch and as the pawl is initially positioned in the latched position.
Figure 13:
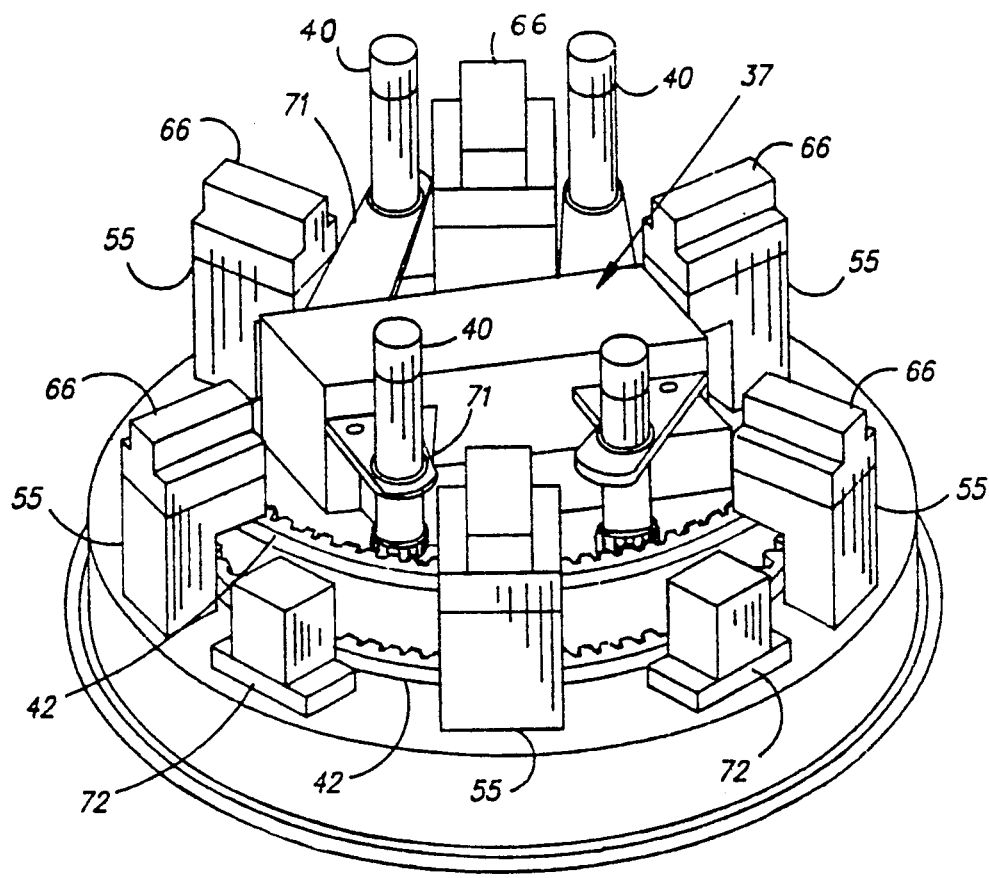
FIG. 13 is a view in perspective showing the mounting of principal components of the invention to the payload support base of the invention.
Figure 14:
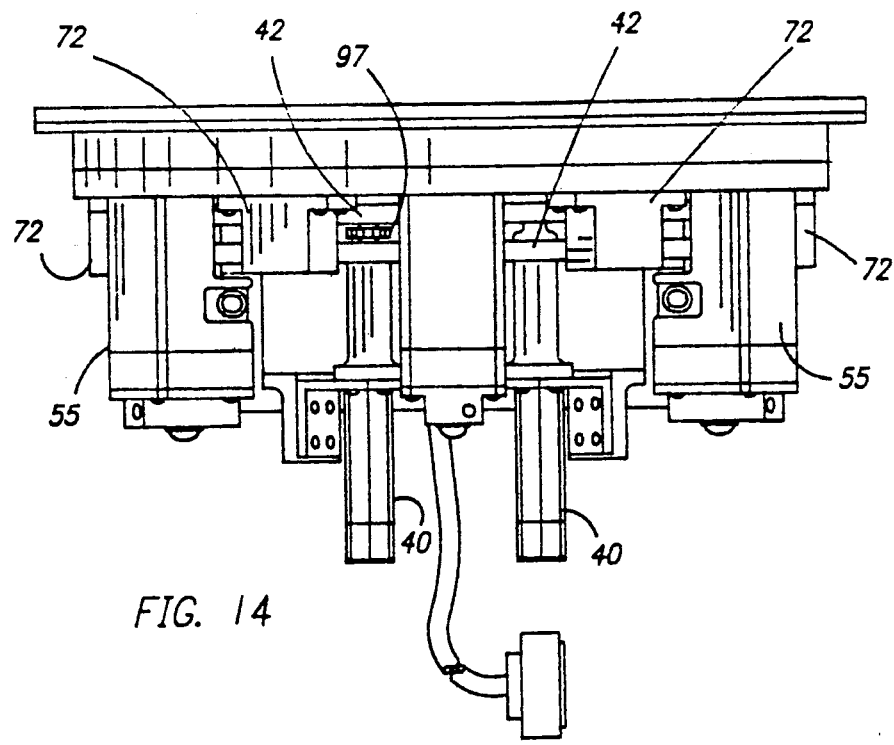
FIG. 14 is a side view of the invention inverted with respect to FIG. 13 and further showing an electrical connector.

The base plate 25 of the device 10 is preferably of light weight material, such as aluminum, and in addition to the holes or sockets 23,24 is provided with four equal sized rectangular openings 28 located at the four corners of a square area which encloses the mirrored surface and the cross hair lines 27. The rectangular openings 28 are provided to receive the end poles of the magnet cores of a pair of electromagnets 30A,30B mounted to the underside of the base plate 25 as shown in FIGS. 1, 13, and 14. The mirrored surface, which could be provided by a polycarbonate resin such as LEXAN or a highly polished stainless steel, may be applied directly to the base plate 25 or applied to the top of a cross-shaped insert which seats in a rectangular opening provided centrally in the base plate 25. Also, as shown in FIG. 12B base plate 25 is the base plate 25 is provided with an annular bellville spring washer 26 which seats in an upward facing concentric annular groove 26A formed adjacent the periphery of the base plate 25 with the upper annular edge of the washer 26 protruding above the surface plane of the base plate 25 when the spring washer is in unstressed condition. The washer 26 is part of the electromechanical latching assembly of the invention, and as will hereinafter be described, assists in the mechanical latching of the payload on the payload retention device 10 after capture of the payload by the electromagnetic grappling system of device 10.

Figure 3:
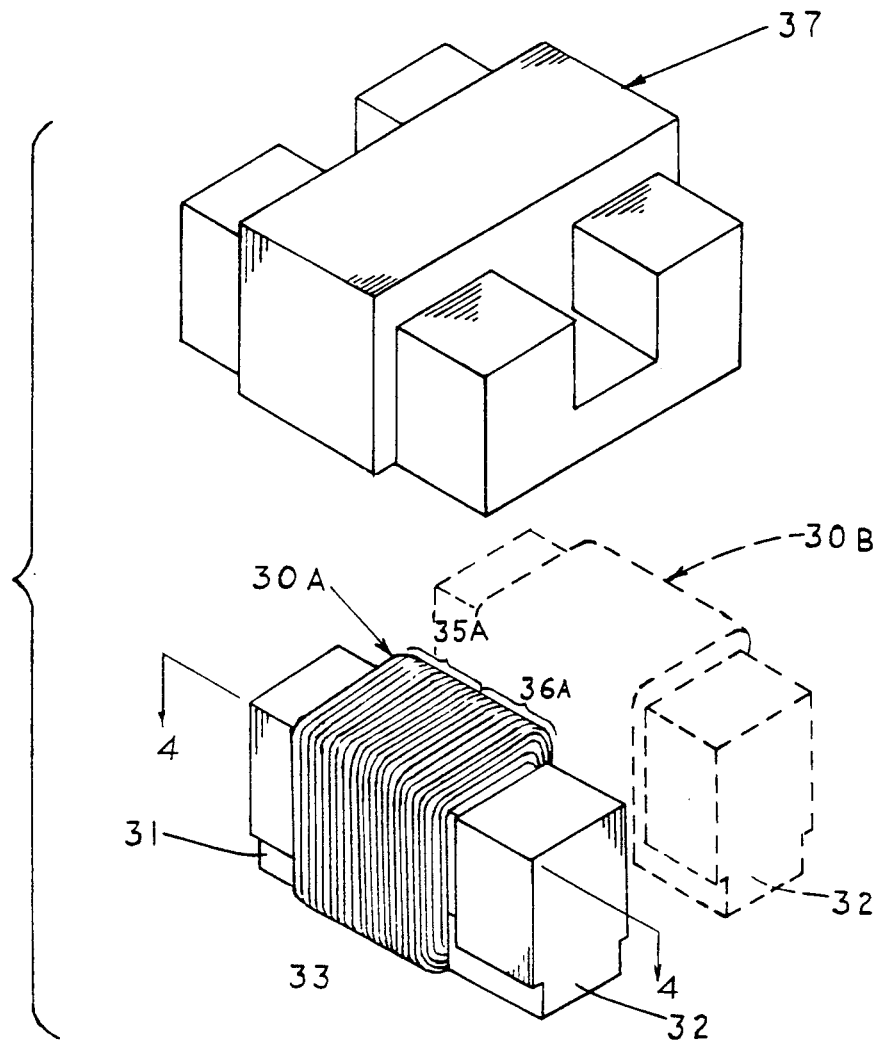
FIG. 3 is an exploded view in perspective of an electromagnetic assembly included in the invention.
Figure 4:
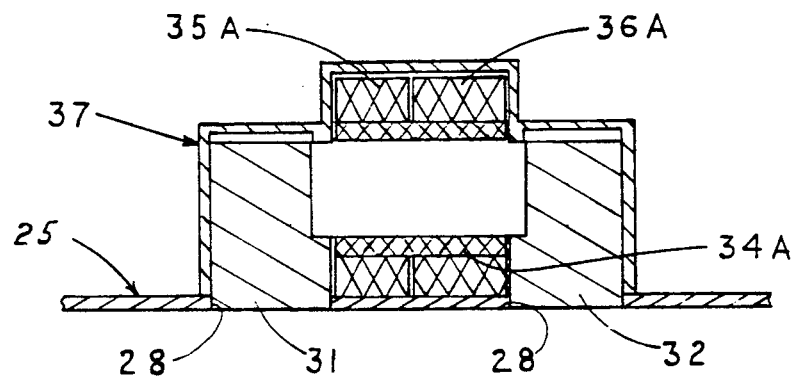
FIG. 4 is a section view as taken along the section line 4—4 of one of the electromagnets of the invention as shown in FIG. 3.

The pair of electromagnets 30A,30B are principal components of an electromagnetic grappling system provided in the payload retention device 10. The electromagnets, one of which is illustrated in FIGS. 3 and 4, are adapted by their pole pieces to exert a magnetic attraction force on the ferrous grapple fixture affixed to a payload and to effect the engagement and grappling thereof when the alignment pins of the grapple fixture are received in the sockets 23, 24 of the payload retention device 10. The electromagnets are used when berthing a payload on the device 10 as when a payload is transferred from a remote manipulator system as depicted in FIG. 1, or when deploying a payload from the payload retention device 10 in the cargo bay to a manipulator arm. In addition, the retention device 10 includes an electromechanical latching assembly, to be hereinafter described, which includes a plurality of latching pawls 29 and is provided for carrying launch and landing loads associated with a docked payload on the device 10 during the launch and landing of the space vehicle.

Each of the electromagnets 30A, 30B comprises a U-shaped core 33 of magnetically soft material, such as Permendur, and three separate coils wound thereabout. For each electromagnet, one of the three coils is a high powered pull-in coil which produces an appreciable attractive force with a large air gap, and which is adapted to be automatically switched off after grapple has been achieved. The other two are holding coils which are similar low current coils, with each producing sufficient magnetization to saturate the core and thus develop the full rated holding performance of the electromagnetic retention system. The two holding coils are connected to separate power sources for redundant operation. Once grapple is achieved and the pull-in coil is de-energized, the holding coils remain energized to maintain the magnetomotive force. If one of the holding coils should fail, the other holding coil has sufficient field intensity to hold the payload.

As shown in FIGS. 3 and 4, an assembly of an electromagnet, such as electromagnet 30A, comprises the magnet core 33 with end poles 31, 32, a pull-in coil 34A, and a pair of holding coils 35A, 36A. Each electromagnet is encased in a housing cover 37 which may be fastened to the base plate 25 by means of bolts 39 through bolt holes provided in the cover 37.

Figure 5:
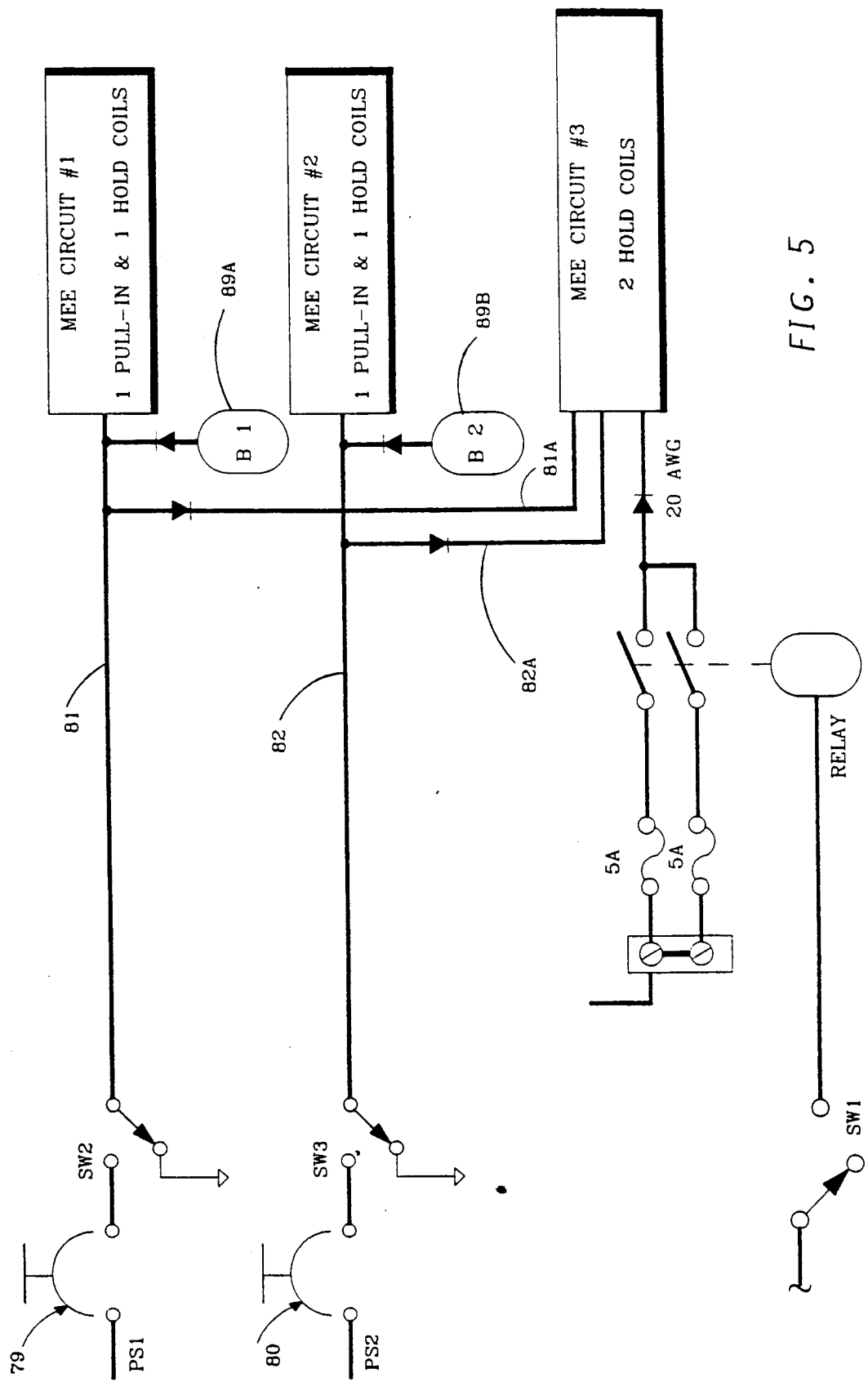
FIG. 5 is an electrical block diagram showing the interconnection of power sources with two primary control circuits and a back-up control circuit used in the invention.

When the astronaut operator has maneuvered the manipulator arm 12 in proximity to the payload retention device, the operator will then throw a switch SW1 located on a switch panel in the ORBITER spacecraft. Closing of the switch SW1, shown in the diagram in FIG. 5, activates control circuit No. 3 which includes the holding coils 36A, 36B of the electromagnets 30A, 30B respectively. The circuit No. 3 serves as a back-up to a control circuit No. 1 and a control circuit No. 2. Circuit No. 1, shown in block diagram in FIG. 6, controls the energizing and de-energizing of the pull-in coil 34A and holding coil 35A of electromagnet 30A whereas control circuit No. 2 controls pull-in coil 34B and holding coil 35B of the electromagnet 30B.

The pull-in coils of the electromagnets are used primarily in a berthing operation, as when a payload carried on the end of a manipulator arm 12 is transferred to the payload retention device 10 for temporary retention and stowage. In a typical berthing procedure, the operator, by use of the targeting and alignment system previously described, aligns the manipulator arm 12 with the payload retention device 10 and closes the range with the manipulator arm 12 to where a grapple and capture of the payload is possible. The operator then energizes the pull-in coils of both electromagnets by closing switches SW2 and SW3 on the switch panel in the ORBITER which close circuit breaker switches, 79, 80, respectively, to connect additional power sources PS1 and PS2 in the ORBITER to the control circuits No. 1 and No. 2, as will be noted by reference to FIG. 5. As also shown therein, the power source PS1 is connected by means of a conductor 81 with the control circuit No. 1 and also to the back-up control circuit No. 3 by a conductor 81A which is coupled to conductor 81. The power source PS2 is connected by a conductor 82 with control circuit No. 2 and also to the back-up control circuit No. 3 by a conductor 82A which is coupled to conductor 82.

Figure 6:
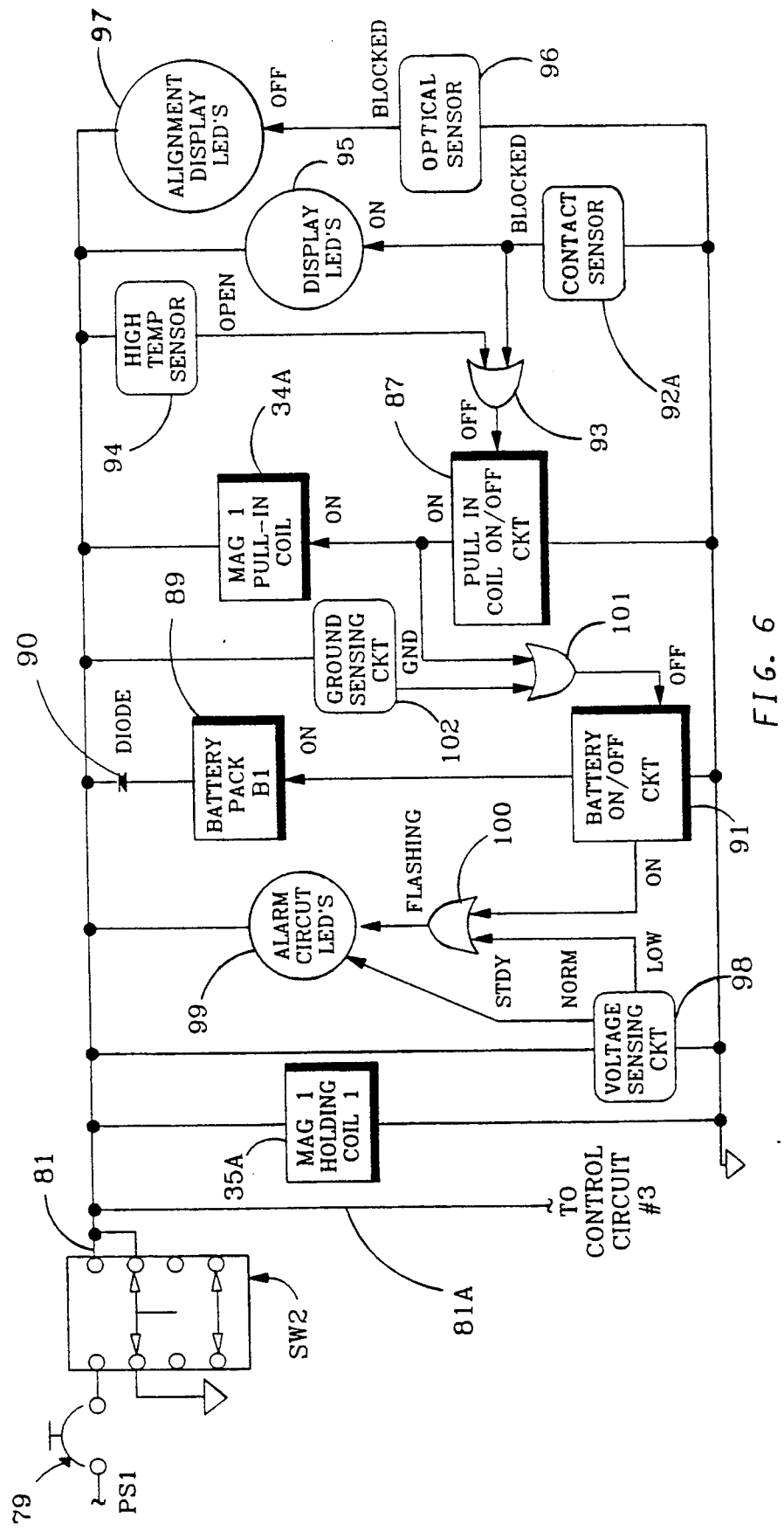
FIG. 6 is an electrical block diagram of a control circuit for one of the electromagnets of the invention.

In control circuit No. 1. shown in FIG. 6, the pull-in coil 34A and holding coil 35A of electromagnet 30A are connected in parallel between conductor 81 and ground. When power is applied to control circuit No. 1 by closure of the switch SW2. coils 34A and 35A of electromagnet 30A are simultaneously energized. In control circuit No. 2 the pull-in coil 34B and one holding coil 35B of electromagnet 30B are connected in parallel between conductor 82 and ground and are simultaneously energized by closure of the switch SW3. It is also to be noted that power delivered to control circuits No. 1 and No. 2 is also delivered to the back-up control circuit No. 3 and the other two holding coils 36A, 36B included therein by means of the conductors 81A, 82A respectively.

Figure 7:
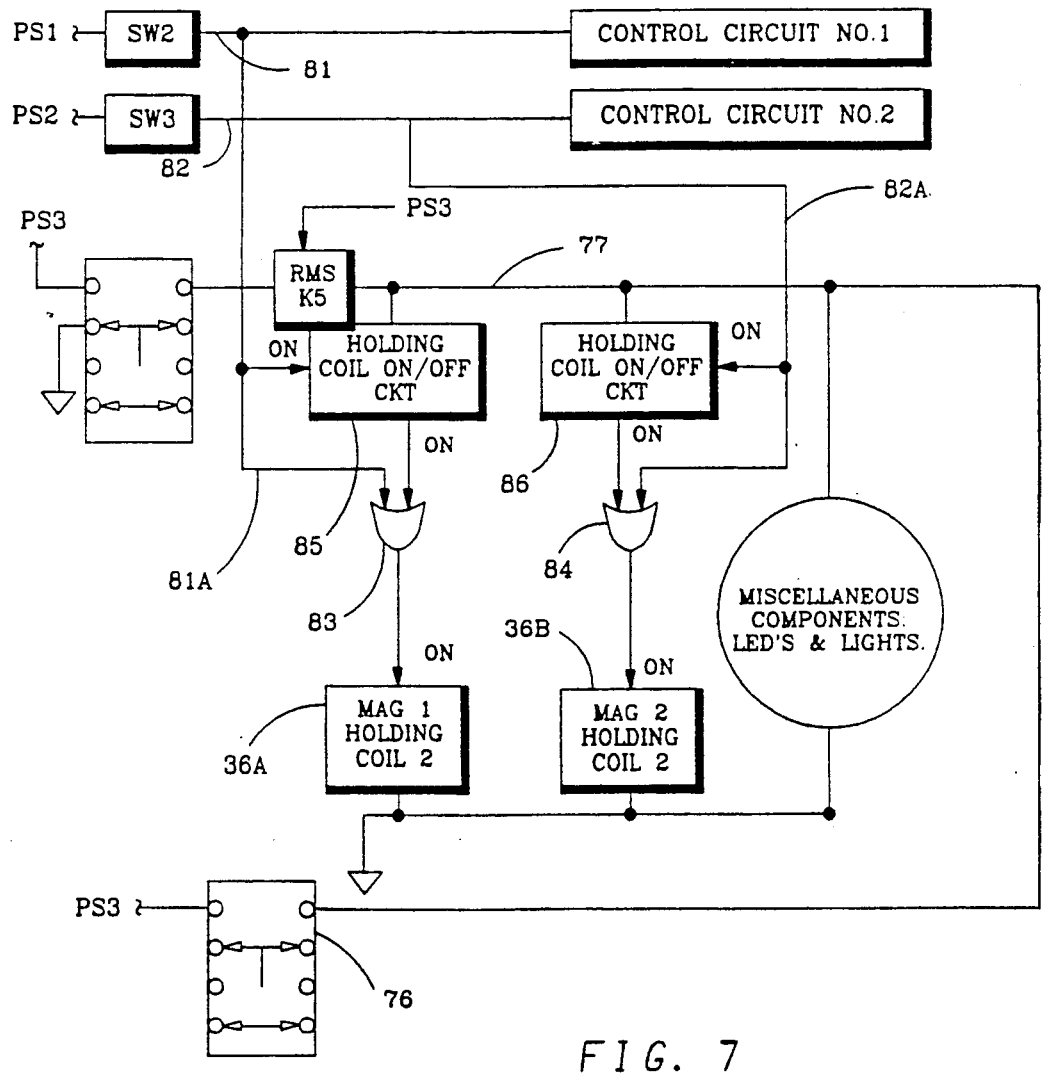
FIG. 7 is an electrical block diagram showing details of the back-up control circuit of FIG. 5.

With reference to the diagram of control circuits, FIG. 7, it will further be seen that the power applied to control circuit No. 3 through conductor 81A is applied to one end of 83, which has one input terminal coupled to the power conductor 81A. The power applied to control circuit No. 3 through conductor 82A is delivered to holding coil 36B of electromagnet 30B through an OR gate 84 which has one input terminal coupled to the power conductor 82A. The other ends of the two holding coils 36A, 36B are at electrical ground.

Control circuit No. 3 also includes a holding coil ON/OFF circuit 85 which is connected at its output terminal to the holding coil 36A and at its input terminal to conductor 77 and the power source PS3. The power source PS3 is also connected by conductor 77 to the input terminal of a second holding coil ON/OFF circuit 86 which connects at its output to the holding coil 36B. The ON/OFF circuits 85, 86 are in OFF condition until turned on at the same time power is delivered to the control circuits No. 1 and No. 2 and to control circuit No. 3 by the power conductors 81A, 82A which are coupled to second input terminals of the ON/OFF circuits 85, 86, respectively. It will therefore be noted that there are two power sources which energize each of the holding coils 36A, 36B of the electromagnets 30A, 30B, respectively.

In control circuit No. 1, the holding coil 35A of electromagnet 30A is connected at one end to the power conductor 81 and to ground potential at the other end. The pull-in coil 34A which also connects the power conductor 81 is coupled to ground through a pull-in coil ON/OFF circuit 87 which is turned on as power is applied to the control circuit No. 1 through conductor 81. A battery pack 89A, comprising two 9 volt alkaline batteries connected in cascade to deliver 18 volts, is also connected to the conductor 81 through a diode 90 which blocks current flow to the battery pack from the conductor 81. The battery pack 89A is connected to ground through an ON/OFF circuit 91. When the pull-in coil 34A is energized, the battery ON/OFF circuit 91 is OFF.

As previously noted, the pull-in coils when energized, exert a strong attractive force for effecting a grapple. When the pole faces of the electromagnets 30A, 30B are in flush contact with the base plate on the payload, the pull-in coils 34A, 34B are automatically de-energized by an electrical signal from contact sensor 92 in the control circuits Nos. 1 and 2, respectively. The sensor 92, mounted on the base plate 25, is a contact switch which detects the flush contact of the ferrous strike plate 20 on the payload with the payload retention device 10 and the compression of the spring washer 26. In control circuit No. 1 the contact sensor signal is coupled to an input terminal of an OR gate 93, the output of which is coupled to the pull-in coil ON/OFF circuit 87 to turn this circuit OFF and de-energize the pull-in coil. Its operation in control circuit No. 2 is identical. It will thus be seen that the payload is then held by the attractive force of the four holding coils in the two electromagnets, each holding coil of which produces sufficient magnetization to saturate the core of its associated magnet.

As a precaution in the event an operator should leave the pull-in coil 34A energized for a relatively long time, inadvertent or otherwise, without effecting a grapple, the resultant overheating of the pull-in coil will cause a high temperature sensor 94 coupled between the conductor 91 and OR gate 93 to transmit a signal to the pull-in coil ON/OFF circuit 87 through the OR gate 93, which turns the circuit 87 OFF and de-energizes the pull-in coil. In addition, a visual display 95 of light emitting diodes coupled to the contact sensor 92 and conductor 81 is also activated by an output signal from the contact sensor 92 to indicate when contact has been accomplished. An optical sensor 96, also an optical switch, is connected in parallel with the contact sensor 92 and is adapted to signal a visual display 97 of light emitting diodes when the latching pawls are in their latching condition and the payload is securely latched. If desired, an optical sensor, such as sensor 96, might be mounted adjacent each pawl in a manner to be hereinafter described.

The control circuit No. 2 which controls electromagnet 30B includes similar components and sensors which function in the same manner as described in the operation of control circuit No. 1 for energizing and de-energizing pull-in coil 34B. Likewise, the description herein of other components and their operation in control circuit No. 1 is equally applicable to control circuit No. 2 which includes similar components.

In control circuit No. 1 voltage sensing circuit 98 connected between the conductor 81 and ground continuously monitors the power supply voltage. The voltage sensing circuit 98 is provided with two output terminals, one of which is connected directly to a visual display 99 of light emitting diodes and supplies a signal to maintain the display in a steady state when the power supply is at a normal level. A second output terminal of the voltage sensing circuit 88 is coupled to the visual display 99 through an OR gate 100 and provides a signal thereto which flashes the display 99 whenever the sensed voltage drops below a predetermined level.

When the pull-in coil 34A is de-energized by the contact sensor, this condition is signaled to the battery ON/OFF circuit 91 through an OR gate 101 which is coupled between the ON/OFF circuit 91 and the low voltage end of the pull-in coil. Although the battery ON/OFF circuit 91 comes on instantly, the batteries 89A do not discharge through the diode 90 since the voltage at the pull-in coil 34A is higher than the battery voltage. However, the battery pack will discharge current through the diode 90 if the power supply PS1 should fail or drop below 18 volts.

Also included in control circuit No. 1 is a ground sensing circuit 102 which is coupled between the power conductor 81 and the battery ON/OFF circuit 91 through the OR gate 101. The ground sensing circuit 102 signals the battery ON/OFF circuit 91 to turn the battery pack off when the astronaut operator switches the ORBITER vehicle power supply PS1 to ground and intentionally removes power from the control circuit.

It is to be understood that the control circuit No. 2, which controls the electromagnet 30B, is otherwise identical to control circuit No. 1, and includes a similar voltage sensing circuit for monitoring power supply voltage, a similar ground sensing circuit, and its own reserve battery pack 89B.

It will therefore be seen that the electromagnetic retention system disclosed herein is two fault tolerant in both grapple and release. The electromagnet retention system utilizes two electromagnets, each with a pull-in coil and two holding coils with all coils being provided with an available back-up power source. The pull-in coils, which are energized to overcome the air gap to the payload target, are also automatically de-energized immediately after grapple to reduce the overall coil heat dissipation. However, it is also possible for the electromagnets to get too cold, particularly during periods of non-use, such that they will draw excessive current when first energized. To minimize such effects, a pair of heater "strips" 97 are fastened to the magnet housing 37 and included in a thermostat-controlled circuit whereby the heaters are turned on at approximately 63° F. and are turned off at approximately 72° F.

Once the payload is "seated" and held on the base plate 25 by the holding coils, which condition is signaled to the astronaut operator, the operator can then operate the electromechanical latching assembly for mechanically securing the payload on the payload retention device 10. When a latched condition is achieved as indicated by the optical sensor 96 the operator may then switch off the electromagnet grappling system.

Figure 8:
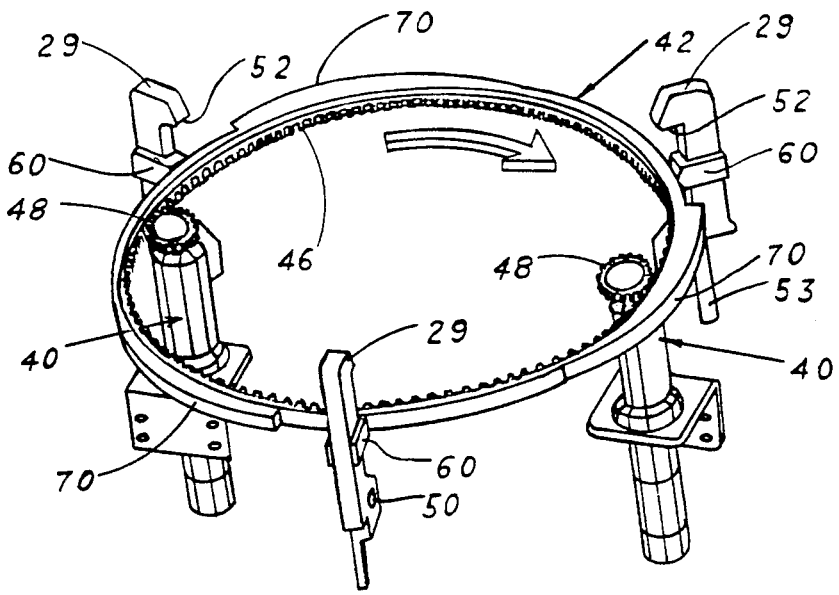
FIG. 8 is a perspective view of one of two electromechanical latching assemblies of the invention.
Figure 9:
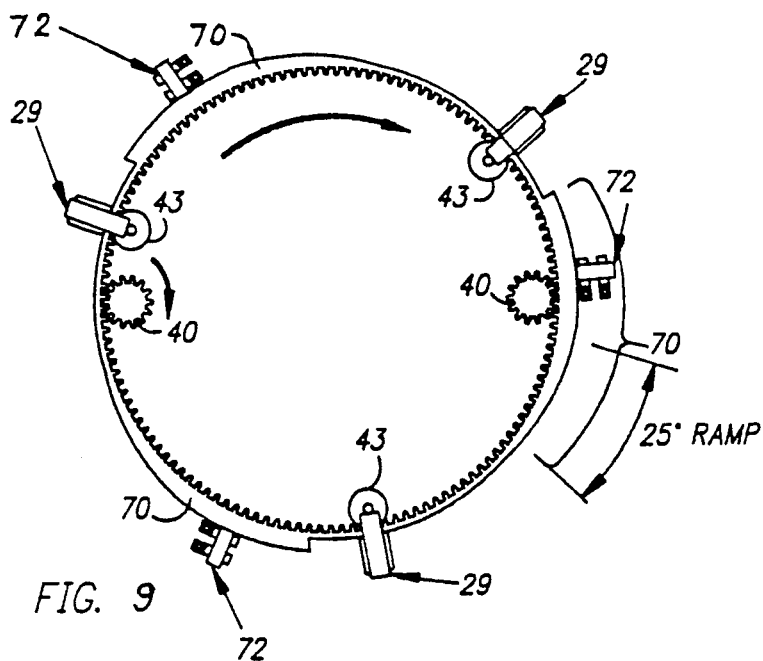
FIG. 9 is a plan view of the electromechanical latching assembly shown in FIG. 8 with the further addition of position switches which are cam-operated to turn off the gearmotors of the latching assembly when the latching pawls of the latching assembly are in latching position.
Figure 10:
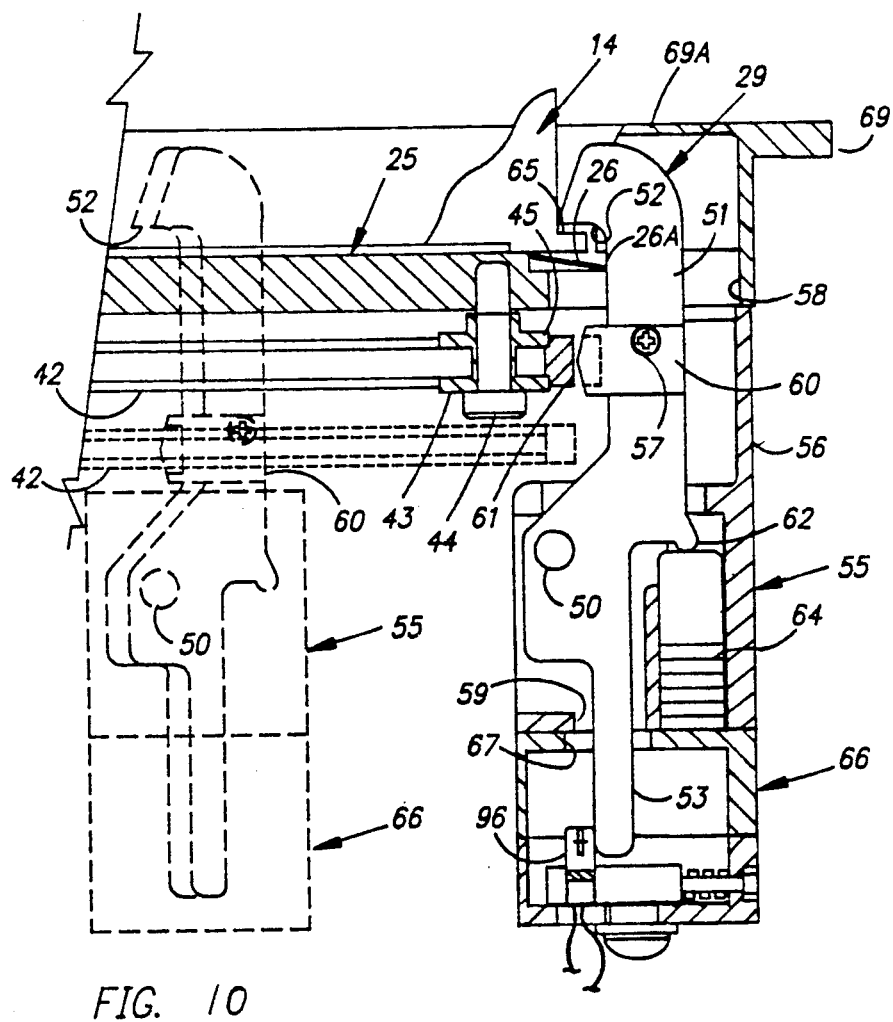
FIG. 10 is a fragmentary section view taken along a radial plane through one of the electromechanical latching assemblies of the invention.

The electromechanical latching assembly of the payload retention device 10 includes two independent latching subsystems, each of which consists of three latch pawls 29, two motors 40 with overriding clutches, and one cam ring/gear 42, arranged and operatively associated as shown in FIGS. 8 and 9. The cam ring gear 42 is supported on three guide spools 43, each of which is bolted to the underside of the base plate 25 by means of a shoulder bolt 44 as shown in FIG. 10. The guide spools 43 are arranged in 120 degree equiangular spacing as shown in FIG. 9 and are disposed adjacent the periphery of the cam ring gear 42. A pair of annular grooves 45 are formed in the upper and lower annular surfaces of the cam ring gear 42 extending to its inner periphery and each receiving one of the edges of the spool 43, such that the cam ring gear is supported on the spool and journaled for rotation about its central axis. The cam ring gear 42 is also provided with inner gear teeth 46 which are drivingly connected by pinion gears 48 to the drive shafts of the gearmotors 40 in a manner to be hereinafter described.

Each of the latching pawls 29, as seen in FIG. 10, includes an elongate shank portion 51 with a latching hook 52 on one end and a foot portion 53 at the other end. The pawl is mounted for pivotal movement on a pivot pin 50 which extends through an accommodating opening in the pawl at a location intermediate its shank 51 and foot portion 53. The pawl box 55 is open at the side thereof which faces the cam ring gear 42 and includes an extension 56 which is secured to the underside of the base plate 25. The shank of the pawl extends through an over-sized opening 58 in the base plate 25 adjacent the periphery of the base plate 25 and is oriented with its hook end 52 disposed towards the center of the cam ring gear 42. The pawl box 55 is also provided with a slot opening 59 in its bottom wall through which the foot portion 53 of the pawl extends. The opening 59 is over-sized with respect to the lateral cross-section of the foot portion 53 so as to accommodate a limited pivotal movement of the pawl.

At substantially the mid-point of its shank portion 51, the pawl is fitted with a cam follower 60 which is secured to the shank by a screw 57 and includes a cam follower surface 61 which faces the outer peripheral edge of the cam ring gear 42. The pawl 29 includes a heel portion 62 which projects downwardly against an upwardly biased plunger 63 which seats atop a wave spring or coil spring 64 anchored in a lower corner of the pawl box. Accordingly, the spring 64 applies a counter-clockwise pivotal bias to the pawl 29 as viewed in FIG. 10 such that the cam follower 60 is in constant engagement with the cam ring gear 42. In addition, the length of the pawl shank 51 is such that the hook 52 and its latching surface is spaced above the planar surface of the base plate 25 to accommodate its latching engagement with the annular lip 65 which is provided about the periphery of the base plate or strike plate secured as a grapple fixture on the payload to be latched. As best seen in FIG. 10, the latch hook surface 52 extends downwardly at an acute angle with respect to the shank 51 and the lip 65 is provided with a conforming latching surface 65A which extends upwardly towards the outer edge of the lip 65.

In the second latching subassembly of which the cam ring gear is disposed in concentric relation with the cam ring gear of the first latching subassembly but at a greater distance from the base plate 25, the pawls 29 are of equal length with the pawls 29 of the other latching subassembly and are identical thereto with the exception that the cam follower is secured to the pawl shank at a location closer to its pivot and thereby engages the periphery of its associated cam ring gear.

A switch box 66 is bolted to the outside of the lower wall of the pawl box 55 and includes an opening 67 in registry with the slot opening 59 in the pawl box for accommodating the foot portion 53 of the pawl. An optical switch 96 is mounted in the switch box 66 in a position to indicate and verify when the pawl is in its latching condition by detecting the pivotal position of the pawl foot 53. The optical switch, of conventional type, generates an electrical signal when the pawl is in the latched condition which activates an appropriate visual indicator, such as the light-emitting-diode display 97 shown in FIG. 6.

As best seen in FIGS. 8 and 9, the cam ring gear 42 of each independent latching subsystem is provided with three camming surfaces 70, each of which extends throughout an arc of approximately 70 degrees with respect to the center of the cam ring gear and includes a ramp surface of gradually increasing radial distance from the center of the cam ring gear. The three camming surfaces 70 are uniformly spaced and are separated by 50 degree arcuate portions of the cam ring gear, the external surfaces of which are at uniform radial distance from the center of the cam ring gear but of lesser radial distance than the camming surfaces 70.

Figure 12A:
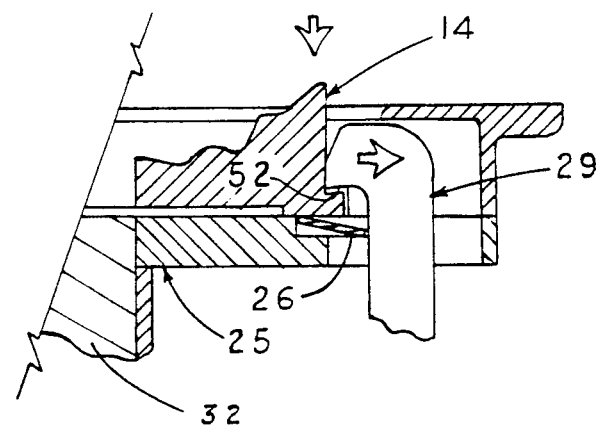
Figure 11:
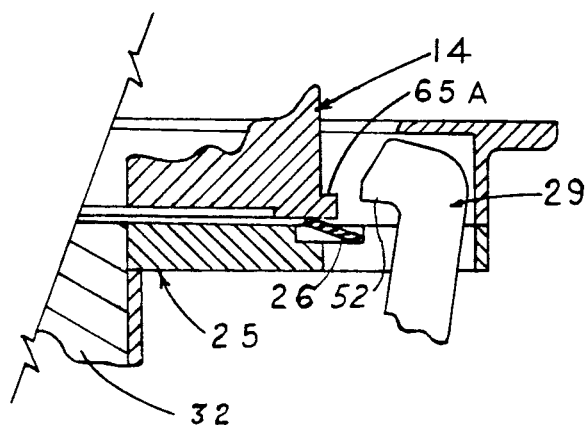
FIG. 11 is a fragmentary section view similar to FIG. 10 but showing the position of a latching pawl as it begins movement from the unlatched position to a latching position.

It will therefore be seen that when the magnets are energized to unlatch the payload as seen in FIG. 12A, and as the cam ring gear is rotated in the clockwise direction, by the motors 40, the cam followers 60 of each of the pawls will be moved outward as the followers engage the camming surfaces 70, thereby driving the pawls in a pivotal movement counter to the biasing force of the wave springs 64 such that the pawls begin to unlatch as shown in FIG. 12B and move to an unlatched condition as shown in FIG. 11.

Three position switches 72 are also located about the periphery of the cam ring gear 42 with their movable switch elements disposed in engagement with the camming surfaces 70 when the cam ring gear and pawls are in their latch positions as shown in FIGS. 8 and 9. In this disposition, the switches 72 operate to transmit electrical signals to shut off and cease the operation of the gearmotors 40. For releasing a payload, the procedure is initiated by means of a panel switch (not shown) wherein the gearmotors of both latching subsystems can again be activated by electrical signal to rotate their cam ring gears to the position wherein the pawls are moved to the unlatched condition with their cam followers in engagement with the camming surfaces 70 and the switching elements of the switches 72 engage the portions of the peripheral surface of the cam ring gear which are of uniform and lesser radius. The gearmotors 40 may then again be activated to drive the cam ring gear 42 until they are turned off by the position switches 72 when the cam ring gear and pawls reach the latched condition.

To achieve the latching condition, it is necessary that the payload be maintained flush against the base plate 25 by the electromagnetic retention system in order to allow the hook ends of the pawls to clear the upper edge of the lip 65 on the payload as it moves from a position as seen in FIG. 11 towards the center of the cam ring gear to the position shown in FIG. 10. Once this is achieved, the operator may then turn off the electromagnets so that the spring washer 26 forces the payload and its lip 65 upwardly into latching engagement with the pawl hooks as in FIG. 12B.

To unlatch, the payload must again be drawn flush against the base plate 25 as in FIG. 12A by energizing the electromagnets so that the latching pawls can clear the annular lip 65 and move outwardly away from the cam ring gear.

For protecting the pawls and also serving as a structural support member, a ring flange 69 is provided atop the base plate 25 about the periphery thereof and secured thereto by bolts or other means. As shown in FIGS. 7 and 12, the flange is provided with a radial cross section of inverted generally "U" shape configuration and is also provided with six slots 69A formed in its upper and inner surfaces for accommodating the pawls 29 and their pivotal movements.

Figure 15:
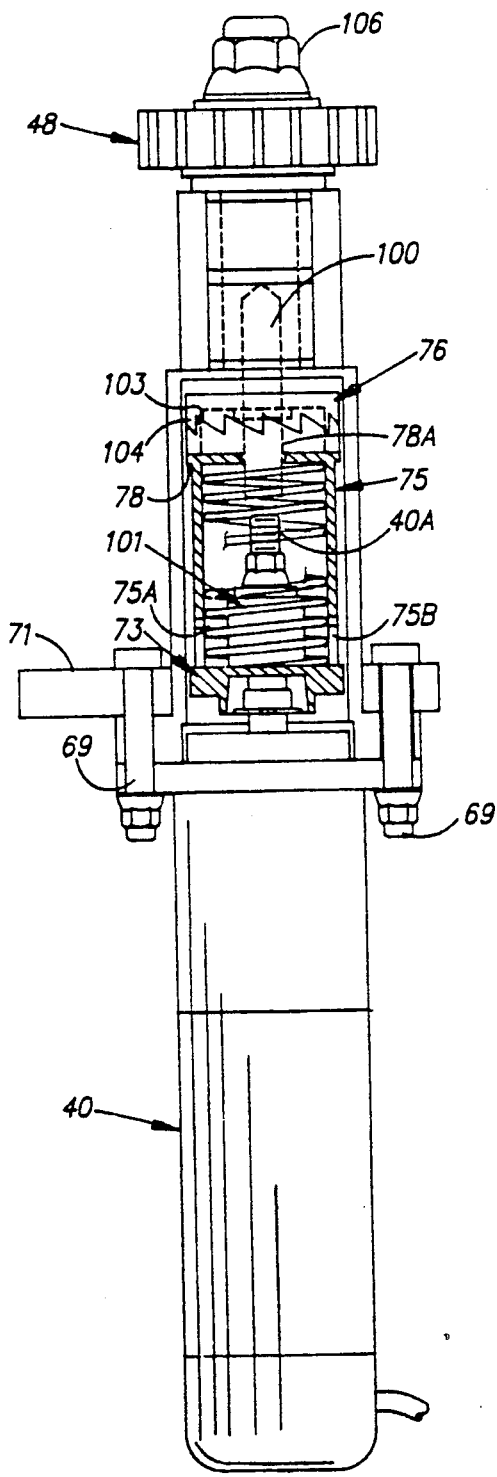
FIG. 15 is a side view of a gearmotor used in one of the electromechanical latching assemblies of the invention with parts broken away to show structural details.

The gearmotors 40 for driving the cam ring gear 42 in a mechanical latching subsystem are two in number and are mounted to the base plate 25 in diametrically opposite positions with respect to the cam ring gear 42, as shown in FIGS. 8, 9 and 13. Each gearmotor 40 is secured by bolts 69 to a bracket 71 which is bolted to the electromagnet housing 37, there being one such bracket 71 for each gearmotor 40. A gearmotor 40 and details of the ratchet drive mechanism provided therefor are shown in FIG. 15.

Figure 17B:
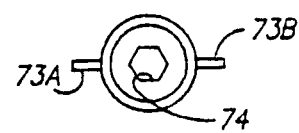
FIGS. 17A and 17B are a sectional view and an end view, respectively, of a coupling member which couples the gearmotor of FIG. 15 to a lower ratchet member.
Figure 17A:
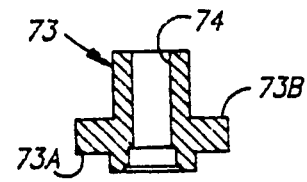

The drive shaft 40A of the gearmotor 40 is fitted with a coupling member 73, shown in detail in FIGS. 17A, 17B. The coupling 73 is provided with a central axial opening 74 of hexagonal configuration in radial cross section in conformance with the radial cross section of the drive shaft 40A about which it is closely fitted in sleeved relationship. It is also provided with diametrically opposed radially extending ears 73A, 73B.

Figure 16:
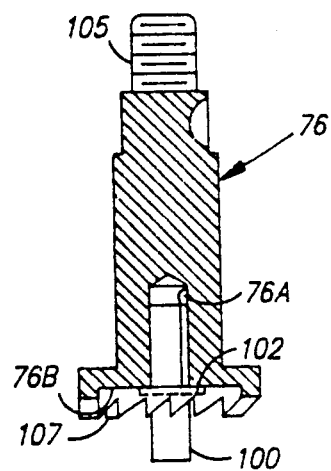
FIG. 16 is a side view partly in section of the upper ratchet of the gearmotor of FIG. 15 and showing an alignment pin installed thereon.

The coupling 73 serves to couple the motor drive shaft 40A to a ratchet drive mechanism which comprises a lower ratchet member 75 and an upper ratchet member 76, shown in sectional view in FIG. 16. The lower ratchet member 75 is of circular cylinder configuration which is open at one end and closed at the other by a transverse member 78, except for a relatively small central opening formed in its closed end which accommodates the lower end portion of an alignment pin 100 for aligning the two ratchet members 75, 76 in a manner to be hereinafter described. The lower ratchet member 75 houses a coiled spring 101 which is sleeved about the motor drive shaft 40A with one end of the spring seated on the coupling 73 and its other end in abutting relation to the inner surface of the closed end 78 of the ratchet 75. The lower ratchet is therefore biased by spring 101 into engagement with the upper ratchet member 76.

The cylindrical wall of the lower ratchet 75 is provided with two diametrically opposed slots 75A, 75B which extend from the open end of the ratchet cylinder in the longitudinal direction of the cylinder. The slots 75A, 75B receive the two ears 73A, 73B respectively, of the coupling 73 such that axial rotation of the coupling 73 produces axial rotation of the lower ratchet 75.

The lower ratchet member 75 is provided with a plurality of teeth 103 formed on the upper circular edge of an annular member 104 which is attached to the exterior of the closed end 78 in concentric relation thereto. The upper ratchet member 76, shown in sectional view in FIG. 16, comprises an elongate shaft portion with external threads 105 formed at one end for accommodating threaded connection with a pinion gear 48 and an end nut 106 for securing the pinion gear. At its other end, the upper ratchet member 76 is provided with a plurality of teeth 107 which conform in configuration with the ratchet teeth of lower ratchet 75. The teeth of both ratchet members include vertically extending tooth edges as viewed in FIG. 15 which extend in the longitudinal direction of the ratchet members parallel to their axes. For all teeth in the lower ratchet member 75, a sloping tooth edge also extends from the lower end of a vertical tooth edge and rises upwardly to the upper end of the next adjacent vertical tooth edge to the left thereof. In the upper ratchet member, each tooth includes a sloping edge which extends downwardly from the top of its vertical tooth edge to the lower end of the vertical edge on the tooth to its right as viewed in FIG. 15. It will therefore be seen, that when the ratchet teeth of the upper ratchet 76 are meshed with the ratchet teeth of the lower ratchet 75, an axial rotation of the lower ratchet member in the direction of rise of the sloping edges of its ratchet teeth, places its ratchet teeth in driving engagement with the upper ratchet teeth, thereby driving the upper ratchet member 76 and its pinion gear 48 in the clockwise direction of axial rotation as seen in FIG. 9. The cam ring gear 42 which is engaged by the pinion gear 48 is also driven in the same clockwise direction.

The upper ratchet member 76 is also provided with a blind axial bore 76A which extends from the toothed end of the ratchet member 76 and is adapted to snugly receive the upper end portion of the alignment pin 100 as shown in FIGS. 15 and 16. The lower end portion of the alignment pin 100 extends through the opening 78A in the closed end 78 of the lower ratchet member 75. Preferably, an annular flange 102 is provided for the pin 100 which abuts a downward facing shoulder 76B of the ratchet member 76 as provided by an enlarged diameter portion of the bore 76A. It will thus be seen that the ratchet members 75, 76 are retained in axial alignment by the alignment pin 100.

It is also to be noted that if either one of the two gearmotors in a mechanical latching subsystem should fail, the other gearmotor will continue to drive the cam ring gear 42 in its clockwise direction of rotation by virtue of the clutch override provided by the yielding connection of the two ratchet members as described above. In the event of a failure of one gearmotor which precludes axial rotation of the lower ratchet member 75, the continued operation of the other gearmotor will continue to drive the cam ring gear 42 and also the pinion gear 48 which is operably connected to the failed gearmotor, thereby continuing the axial rotation of the upper ratchet member 76 which is permitted by the upper ratchet teeth riding over the teeth of the lower ratchet member 75. The override is possible because the upper ratchet teeth force the lower ratchet member 75 downwardly against the biasing force of the coiled spring 101 as is permitted by the slotted connection of the coupling 73 with the lower ratchet member 75. In this respect, the slots 75A, 75B in the cylinder wall of ratchet member 75 are designed with sufficient length to allow the override.

It will therefore be seen that in addition to a two fault tolerant magnetic retention system, the payload retention device 10 includes an electromechanical latching assembly which is two fault tolerant with respect to latching a payload since it is only necessary that the cam ring gear and pawls of one latching subassembly be movable to the latching position, which condition can be achieved if only one gearmotor is operational. However, the electromechanical latching assembly is single fault tolerant with respect to release of a payload since release requires that both cam ring gears and all pawls of both latching subassemblies must be movable to the release position.

It will further be seen that the payload retention device of the present invention comprises an electromagnetic retention system for effecting the grapple of a target payload in combination with an electromechanical latching assembly which is particularly useful in handling the force loads imposed on a payload docked in the cargo bay of a space vehicle during the launch and landing phases of a space flight. The combination of mechanical latches and magnetic grappling is provided to ensure there are no failures as would cause an unsafe condition. The systems for magnetic grappling and mechanical hold-down are independent and the electromagnets can be energized at any time power is available.

It is also to be understood that the foregoing description of a preferred embodiment of the invention has been presented for purposes of illustration and explanation and is not intended to limit the invention to the precise form disclosed. For example, the number of electromagnets in the electromagnetic retention system and the number of coils on the electromagnets themselves could be other than described. Also, if desired a third independent latching subassembly which provides a third cam ring gear with additional pawls and gearmotors could be provided if greater fault tolerance is desired for latching capability. It is to be appreciated therefore that various structural changes may be made by those skilled in the art without departing from the invention.

I claim:

1. A payload retention device for grappling and retaining a payload in a docked position on a support structure mounted in the cargo bay of a space vehicle, and wherein said payload is provided with a grapple strike plate, said device comprising:
   a base plate mounted on said support structure;
   at least one electromagnet mounted to said base plate, said electromagnet comprising a U-shaped magnetic core with pole pieces at the ends thereof and a plurality of coils wound about said magnetic core between said pole pieces, said base plate having openings therethrough which receive and accommodate said pole pieces therein;
   means for energizing said coils whereby said electromagnet exerts an attractive force on the grapple strike plate affixed to said payload when the payload is moved in proximity thereto and causes said pole pieces to contact and grapple said strike plate;
   contact sensor means for detecting the contact of said pole pieces with said strike plate and the grappling of the payload to said base plate and generating an electrical output signal indicative thereof;
   an electromechanical latching assembly comprising a pair of independent latching subsystems, each said latching subsystem comprising a cam ring gear mounted to said base plate and journalled for axial rotation thereon with said base plate being in substantially concentric parallel relation to both cam ring gears;
   a plurality of camming surfaces provided on each said cam ring gear at equiangularly spaced locations about the periphery thereof;
   a first set of latching pawls mounted to said base plate at equiangularly spaced locations relative to said base plate and cam ring gear of a first of said latching subsystems;
   a second set of latching pawls mounted to said base plate at equiangularly spaced locations relative to said base plate and cam ring gear of a second of said latching subsystems with the latching pawls of each of said sets being mounted adjacent a peripheral edge of the base plate at locations intermediate the locations of the other set of latching pawls, each said pawl having a cam follower surface adapted to engage with a peripheral surface of the associated cam ring gear of its latching subsystem and each said pawl having a latch hook formed adjacent one end of the pawl;
   means for mounting each said latching pawl for pivotal movement whereby the latch hook of each said pawl is movable towards and away from the center of its associated cam gear ring;
   means for biasing each said latching pawl in pivotal movement towards the center of the associated cam ring gear of its latching subassembly such that the cam follower surface of the pawl is continually engaged with the peripheral surface of its associated cam gear ring and whereby the cam follower surface of each said latching pawl is engaged by a different one of said camming surfaces upon a predetermined amount of axial rotation of its associated cam ring gear to induce pivotal movement of the pawls to a latching position wherein the latch hook of each said pawl is at an innermost position relative to the center of its associated cam ring gear and is adapted to engage a latching surface provided on the strike plate of a target payload when the payload is seated on said base plate;
   each said latching assembly including motor means which are selectively energizeable for driving the cam ring gear of the latching subassembly in unidirectional rotation about its central axis in concert with the axial rotation of the other of said cam gears and further including switch means responsive to the axial rotation of the cam ring gear to de-energize said motor means and halt the rotation of the cam ring gear when the latching pawls are in the latching position; and
   spring means mounted on said base plate for biasing a grappled payload into firm latching engagement with the latch hooks of each said latching pawl when all the coils of the electromagnets are de-energized.

2. A payload retention device as set forth in claim 1 wherein said strike plate is provided with alignment pins which project outwardly of said strike plate and are adapted for interconnection with sockets provided in the base plate of said payload retention device when the payload is aligned for docking engagement with said base plate preparatory to effecting a grapple of the payload.

3. A payload retention device as set forth in claim 1 wherein said electromagnet coils comprise a pair of holding coils and a pull-in coil for generating an attractive force sufficient to cause said magnet pole pieces to attract the strike plate on said grapple fixture to said electromagnet to effect a grapple of said payload when in contact with said base plate; and
   means responsive to the signal from said contact sensor means for automatically de-energizing said pull-in coil whereby the grapple of the payload is maintained solely by the attractive force of said holding coils.

4. A payload retention device as set forth in claim 1 wherein the motor means in each said latching subassembly comprises a pair of gearmotors, each coupled by a ratchet clutch drive mechanism in driving connection with the associated cam ring gear of the latching subassembly for effecting the axial rotation thereof whereby in the event of failure of one of the gearmotors the other motor of said pair of gearmotors can effect the axial rotation of the associated cam ring gear and movement of its associated latching pawls to either their latched or unlatched positions.

5. A payload retention device for grappling and retaining a payload in a docked position on a support structure mounted in the cargo bay of a space vehicle, and wherein said payload is provided with a grapple strike plate, said device comprising:

a base plate mounted on said support structure and provided with a planar surface adapted to be contacted by said strike plate;

an electromagnetic grappling system for grappling the payload, said system comprising a pair of electromagnets mounted to said base plate, each said electromagnet comprising a U-shaped magnetic core with pole pieces at the ends thereof and a plurality of coils wound about said magnetic core between said pole pieces, said base plate having openings therethrough which are sized to receive and accommodate said pole pieces;

an annular spring washer mounted on said base plate such that the washer projects from the planar surface of the base plate with an annular edge of the washer disposed parallel to said planar surface and is adapted to be first contacted by the strike plate on a payload to be grappled by said electromagnetic grappling system;

an individual control circuit for each electromagnet;

first and second power sources connectable to said individual control circuits, respectively, for energizing said coils whereby said electromagnets exert an attractive force on the grapple strike plate when the payload is placed in proximity thereto to cause said pole pieces to overcome the spring washer and to contact and grapple said strike plate;

contact sensor means in each said individual control circuit for detecting the contact of the pole pieces of the electromagnets with said strike plate and generating an electrical output signal indicative thereof;

an electromechanical latching assembly comprising a cam gear ring mounted to said base plate and journalled for axial rotation with said base plate being in substantially concentric parallel relation to said cam ring gear;

a plurality of camming surfaces provided on said cam ring gear at equiangularly spaced locations about the periphery thereof;

a plurality of latching pawls mounted to said base plate at equiangularly spaced locations relative to said cam ring gear, each said pawl having a cam follower surface adapted to engage with a peripheral surface of the cam ring gear and a latch hook formed adjacent one end of the pawl;

means for mounting each said latching pawl for pivotal movement whereby the latch hook of each said pawl is movable towards and away from the center of its associated cam ring gear;

means for biasing each said latching pawl in pivotal movement toward said cam ring gear such that the cam follower surface of the pawl is continually engaged with the peripheral surface of the cam ring gear whereby the cam follower surface of each said latching pawl is engageable by a different one of said camming surfaces upon a predetermined amount of axial rotation of said cam ring gear to induce a pivotal movement of the pawl to a latching position wherein the latch hook of said pawl is at an innermost position relative to the center of the cam ring gear and is adapted to engage an annular latching surface provided on a target payload when the payload is seated on said base plate;

motor means which are selectively energizeable for driving said cam ring gear in unidirectional rotation about its central axis; and switch means responsive to the axial rotation of said cam ring gear to de-energize said motor means and halt the rotation of the cam ring gear when the latching pawls are in the latching position, a spring washer mounted on said base plate biasing said payload into firm latching engagement with the latch hooks of the latching pawls when all the coils of the electromagnets are de-energized.

6. A payload retention device for grappling, securing and retaining a payload in a docked position on a support structure in the cargo bay of a space vehicle and wherein said payload is equipped with a grapple strike plate, said device comprising:

a base plate mounted on said support and provided with a support surface adapted to be engaged by said strike plate;

at least one electromagnet mounted to said base plate, said electromagnet comprising a U-shaped magnetic core with pole pieces at the ends thereof and a plurality of coils wound about said magnetic core between said pole pieces, said base plate having openings therethrough which are sized to receive and accommodate said pole pieces therein;

means for energizing said coils whereby said electromagnet exerts an attractive force on a grapple strike plate affixed to said payload when the payload is moved in proximity thereto and causes said pole pieces to attract and grapple said strike plate;

contact sensor means for detecting the contact to said pole pieces with the strike plate and generating an electrical output signal indicative thereof;

an electromechanical latching assembly comprising a plurality of latching pawls mounted to said base plate, each of said latching pawls being provided with a latch hook formed adjacent one end of the pawl;

means for mounting each said latching pawl for pivotal movement whereby the hook surface of said pawl is movable towards and away from the peripheral edge of said base plate;

means for biasing each said latching pawl in pivotal movement toward said base plate to a latching position wherein the latch hook of said pawl is at an innermost position relative to the center of the base plate and is adapted to engage an annular latching surface provided on a target payload when the payload is seated on said base plate; and motor drive means which are energizeable for selectively driving said pawls to the latching position and also for driving said pawls to an unlatching position, said motor drive means comprising at least a pair of gearmotors, each equipped with a ratchet clutch drive mechanism whereby any one of said gearmotors can override the drive mechanisms of the other gearmotors in the event of their failure and thereby move said pawls to the latching position.

* * * * *